United States Patent [19]

Suzuki et al.

[11] Patent Number: 5,214,012
[45] Date of Patent: May 25, 1993

[54] METHOD FOR PRODUCTION OF SILICATE INTERLAYER CROSS-LINKED SMECTITE

[75] Inventors: Kenzi Suzuki, Aichi; Masakazu Horio, Konan; Hiroyuki Masuda, Nagoya; Toshiaki Mori, Yokkaichi, all of Japan

[73] Assignees: Agency of Industrial Science & Technology; Ministry of International Trade & Industry, Tokyo, Japan

[21] Appl. No.: 828,755

[22] Filed: Jan. 31, 1992

[30] Foreign Application Priority Data

Feb. 1, 1991 [JP] Japan .................. 3-099880

[51] Int. Cl.$^5$ .................. B01J 21/16; B01J 20/12
[52] U.S. Cl. .................. 502/62; 502/63; 502/84
[58] Field of Search .................. 502/62, 63, 84

[56] References Cited

U.S. PATENT DOCUMENTS

| | | | |
|---|---|---|---|
| 4,515,901 | 5/1985 | Elattar | 502/63 |
| 4,579,832 | 4/1986 | Shabtai et al. | 502/84 |
| 4,629,713 | 12/1986 | Suzuki et al. | 502/84 |
| 4,753,908 | 6/1988 | Kawase et al. | 502/62 |

OTHER PUBLICATIONS

Clays and Clay Minerals, vol. 27, No. 2, The Clay Minerals Society, 1979, pp. 119–124, S. Yamanaka, et al., "High Surface Area Solids Obtained by Reaction of Montmorillonite with Zirconyl Chloride".

Chemical Reactions in Organic and Inorganic Constrained Systems, 1986, D. Reidel Publishing Company, pp. 151–164, T. J. Pinnavaia, "Pillared Clays: Synthesis and Structural Features".

*Primary Examiner*—Carl F. Dees
*Attorney, Agent, or Firm*—Oblon, Spivak, McClelland, Maier & Neustadt

[57] ABSTRACT

An interlayer cross-linked smectite is produced by a method which includes the steps of preparing a smectite suspension containing a dissolved water-soluble macromolecular compound, adding a cationic hydroxide oligomer to the suspension thereby subjecting the exchangeable cation in the smectite to ion exchange, allowing the resultant smectite suspension to stand at a fixed temperature for a fixed time thereby allowing the cationic hydroxide oligomer of the smectite to age, separating a solid smectite from the resultant suspension, and heating the separated solid smectite. The interlayer interval of the produced smectite can be controlled by adjusting the amount of the cationic hydroxide oligomer.

4 Claims, 1 Drawing Sheet

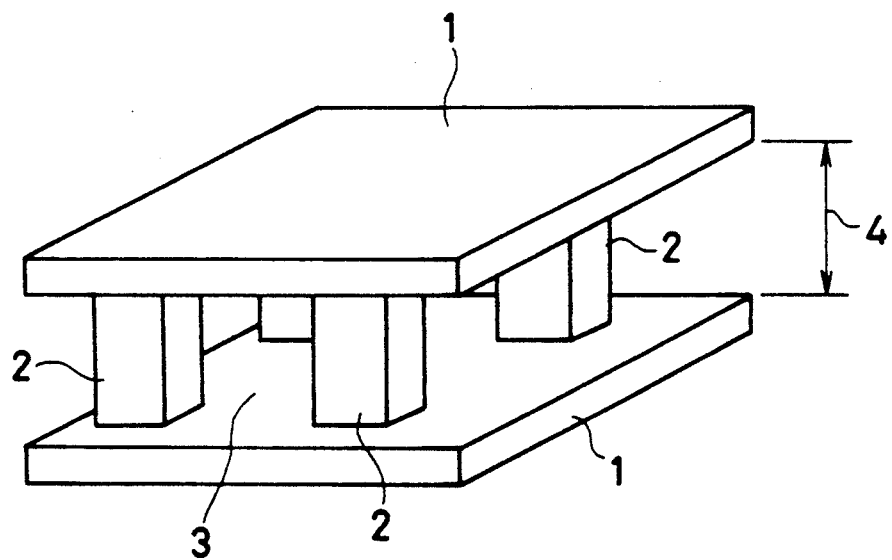

METHOD FOR PRODUCTION OF SILICATE INTERLAYER CROSS-LINKED SMECTITE

BACKGROUND OF THE INVENTION

1. Field of the Invention

This invention relates to a method for the production of a silicate interlayer cross-linked smectite having a desired interlayer interval. The interlayer cross-linked smectite is expected to find utility as a catalyst, a catalyst carrier, an adsorbent, a separating material, etc. Needs are felt for the use in practical applications of various species of cross-linked smectite having various silicate interlayer intervals.

2. Prior Art Statement

The structure of interlayer cross-linked clay will be described below with reference to the accompanying drawing.

In the drawing, pillars 2 of alumina or zirconia intervene between two silicate layers 1 and micropores 3 are present between the two silicate layers which are kept apart by the pillars 2. The distance between the silicate layers is called an interlayer interval 4. No technique has been established to date for the control of this interlayer interval 4.

The interlayer interval of the interlayer crosslinked clay equals the height of pillars supporting the upper silicate layer as observed in the drawing. The interlayer interval is varied proportionately to a change in the height of the pillars. For the production of the interlayer cross-linked clay, a method which comprises introducing a cationic hydroxide oligomer such as of aluminum or zirconium into the space intervening between clay layers of hectorite or montmorillonite by means of ion exchange has been known to the art, for example, R. Setton(ed.), Chemical Reactions in Organic and Inorganic Constrained Systems, pp. 151-164, 1986; S. Yamanaka and G. W. Brindley, Clays and Clay Minerals, vol 27, No. 2, pp. 119-124, 1979. The interlayer interval of the interlayer cross-linked clay which is produced by this method is about 0.8 nm because it is based on the size of the cationic hydroxide oligomer.

The inventors have continued a study for the purpose of developing an interlayer cross-linked clay having a larger interlayer interval and have consequently succeeded in producing an interlayer cross-linked clay having an interlayer interval of at least 20 Å (U.S. Pat. No. 4,629,713, and Japanese patent publications No. 62-12172, No. 62-41167, No. 62-46489, No. 62-46490, etc.). The clay is characterized by having a water-soluble macromolecular compound coexisting in the clay.

In the practical field, a desire has been expressed for the development of a method capable of producing an interlayer cross-linked clay having an interlayer interval desired to meet the purpose of use.

This invention aims at meeting the aforementioned desire and is directed to a method for the production of an interlayer cross-linked clay having a desired interlayer interval. The interlayer interval, particularly that in the range of 0.1 nm to 2.5 nm, can be controlled with ease.

SUMMARY OF THE INVENTION

The object of this invention mentioned above is accomplished by a method for the production of an interlayer cross-linked smectite having a desired interval formed between silicate layers by pillars of the oxide produced from a cationic hydroxide oligomer, which method comprises preparing a smectite suspension having a water-soluble macromolecular compound dissolved therein, adding a cationic hydroxide oligomer to the suspension and allowing the cationic hydroxide oligomer to exchange ions with an exchangeable cation present between silicate layers of the smectite, allowing the resultant smectite suspension in which the cationic hydroxide oligomer and the water-soluble macromolecular compound are interposed between the silicate layers to stand at a fixed temperature for a fixed time, thereby allowing the cationic hydroxide oligomer in the smectite to age and form a desired silicate layer interval in the smectite, separating a solid smectite from the resultant suspension, and subsequently heating the solid smectite.

BRIEF DESCRIPTION OF THE DRAWINGS

The drawing is a diagram illustrating the structure of interlayer cross-linked clay.

DESCRIPTION OF THE PREFERRED EMBODIMENTS

The clay to be used in this invention is smectite, natural or synthetic alike, which conspicuously swells in water. The smectite embraces hectorite, montmorillonite, saponite, beidellite, nontronite, sorconite, stevensite, etc. Now, the nature of smectite will be described with reference to hectorite. First, the structure of hectorite will be explained. The hectorite is a multiplicity of superposed silicate layers having a thickness of about 1 nm.

This hectorite is dispersed in a liquid (generally water) and the resultant dispersion is combined with a water-soluble macromolecular compound to form a suspension of hectorite. The water-soluble macromolecular compounds practicably usable for the purpose of this invention include polyvinyl alcohol and polyethylene oxide. This hectorite suspension is combined with a cationic hydroxide oligomer such as of aluminum or zirconium. The oligomer is prepared by only dissolving $Al_2(OH)_5Cl$ or $ZrOCl_2$ in distilled water and allowing the resultant aqueous solution to stand at rest. The chemical formula of the oligomer is $[Al_{13}O_4(OH)_{24}(H_2O)_{12}]^{7+}$ or $[Zr_4(OH)_{14}(H_2O)_{10}]^{2+}$. The cationic hydroxide oligomer is occluded between the silicate layers of the hectorite by the ion-exchange reaction thereof with the exchangeable cation such as $Na^+$ or $Ca^{2+}$ interposed between the silicate layers. Then the cationic hydroxide oligomer occluded between the silicate layers grows by aging into a large oligomer. The size of the oligomer has bearing on the concentration of the oligomer or the amount of the oligomer added. The growth of the oligomer increases in proportion as the concentration increases or the amount of addition increases.

The method of production according to this invention is characterized by a procedure which comprises adding a water-soluble macromolecular compound to the dispersion of smectite thereby preparing a smectite suspension and then adding a cationic hydroxide oligomer to the smectite suspension. It is also characterized by controlling the amount of the cationic hydroxide oligomer to be added and further allowing the resultant mixture to age.

The smectite suspension obtained as described above is dried and heated. The smectite suspension may be washed or not washed with water before it is dried. The drying may be effected by any of the conventional methods such as, for example, air drying, heat drying, vacuum drying and freeze drying. The separation of water by filtration is similarly available for the drying. The dried smectite is then heated.

The heating converts the hydroxide oligomer between the silicate layers into corresponding oxide, i.e. alumina in the case of an aluminum compound or zirconia in the case of a zirconium compound. The alumina or zirconia forms pillars interposed between the silicate layers and serves to give rise to a required interlayer interval.

Further by the heating, the water-soluble macromolecular compound adsorbed on the smectite is expelled through calcination. The empty space resulting from the expulsion of the water-soluble macromolecular compound constitutes the micropores 3 shown in the drawing.

The heating for the this purpose is given at a temperature of not less than 400° C.

If this temperature exceeds 900° C., however, the heat breaks the crystalline structure of the smectite. Thus, the temperature of this heating is in the range of 400° C. to 900° C. The interlayer interval of the interlayer cross-linked clay which is produced as described above is controlled not to exceed 2.5 nm.

This invention aims to provide a method for the production of an interlayer cross-linked clay having a desired interlayer interval in the range of 0.5 nm to 2.5 nm. This product can be expected to find utility in applications to catalysts, catalyst carriers, adsorbents and separating materials.

Now, this invention will be described more specifically below with reference to working examples.

EXAMPLE 1

A suspension was prepared by stirring 1.0 g of Na-hectorite in 500 ml of distilled water. In this suspension, 50 ml of an aqueous 5 wt % polyvinyl alcohol (PVA) solution added thereto was stirred. One hundred (100) ml of the resultant hectorite suspension containing the dissolved PVA was kept stirred vigorously and 4 ml of an aqueous 2.0 wt % $Al_2(OH)_5Cl \cdot 2.4H_2O$ solution was meanwhile added thereto at a rate of 1 ml per minute. After the addition was completed, the resultant mixture was left aging in an oven at 60° C. for three days, then dried at the same temperature and heated at 500° C. for two hours, to prepare an alumina cross-linked hectorite. By the powder X-ray diffraction method, the product was found to have an interlayer interval of 0.49 nm.

EXAMPLES 2 TO 9

Various species of alumina cross-linked hectorite were produced by following the procedure of Example 1, except that the amount of the aqueous 2.0 wt % $Al_2(OH)_5Cl \cdot 2.4H_2O$ solution to be added to 100 ml of the hectorite suspension was changed to 8 ml, 16 ml, 24 ml, 32 ml, 40 ml, 48 ml, 64 ml and 80 ml. By the powder X-ray diffraction method, these species of alumina cross-linked hectorite were found to have interlayer intervals respectively of 1.32 nm, 1.46 nm, 1.52 nm, 1.64 nm, 1.74 nm, 1.86 nm and 1.93 nm.

EXAMPLE 10

One hundred (100) ml of a hectorite suspension containing dissolved PVA prepared in the same manner as in Example 1 was kept stirred vigorously and 17 ml of an aqueous 10 wt % $Al_2(OH)_5Cl \cdot 2.4H_2O$ solution was meanwhile added at a rate of 1 ml per minute. After the addition was completed, the resultant mixture was left aging in an oven at 60° C. for three days, then dried at the same temperature and heated at 500° C. for two hours, to produce an alumina cross-linked hectorite. By the powder X-ray diffraction method, the product was found to have an interlayer interval of 2.44 nm.

As demonstrated by the working examples, an interlayer cross-linked smectite containing a desired interlayer interval owing to the interposition of oxide pillars between silicate layers can be produced by adjusting the amount of addition and consequently the concentration of a cationic hydroxide oligomer to a smectite suspension containing a dissolved water-soluble macromolecular compound.

What is claimed is:

1. A method for the production of an interlayer cross-linked smectite having a desired interval formed between silicate layers by pillars of the oxide produced from a cationic hydroxide oligomer, comprising the steps of:

preparing a smectite suspension having a water-soluble macromolecular compound dissolved therein;

adding to said suspension a cationic hydroxide oligomer selected from the group consisting of $[Al_{13}O_4(OH)_{24}(H_2O_{12})]^{7+}$ and $[Zr(OH)_{14}(H_2O)_{10}]^{2+}$ in an amount capable of producing pillars of pillars of a length which corresponds to said desired interval and allowing said cationic hydroxide oligomer to exchange ions with an exchangeable cation present between the silicate layers;

allowing the resultant suspension having the ion-exchanged oligomer and the water-soluble macromolecular compound interposed between the silicate layers to stand at a fixed temperature for a fixed time, thereby allowing the ion-exchanged oligomer to age and forming a desired silicate layer interval in the smectite;

separating a solid smectite from the resultant suspension; and heating said solid smectite.

2. A method according to claim 1, wherein said water-soluble macromolecular compound is at least one member selected from the group consisting of polyvinyl alcohol and polyethylene oxide.

3. A method according to claim 1, wherein said smectite is at least one member selected from the group consisting of hectorite, montmorillonite, saponite, beidellite, nontronite, sorconite, and stevensite.

4. A method according to claim 1, wherein the heating of said solid smectite is carried out at a temperature in the range of 400° C. to 900° C.

* * * * *